United States Patent
Caiozza

(10) Patent No.: US 6,426,000 B1
(45) Date of Patent: Jul. 30, 2002

(54) FILTER CARTRIDGE MAGNETIC ATTACHMENT

(76) Inventor: Joseph Caiozza, 321 W. Market St., Long Beach, NY (US) 11561

( * ) Notice: Subject to any disclaimer, the term of this patent is extended or adjusted under 35 U.S.C. 154(b) by 0 days.

(21) Appl. No.: 09/630,898

(22) Filed: Aug. 2, 2000

(51) Int. Cl.$^7$ ............................................. B01D 35/06
(52) U.S. Cl. ...................................... 210/222; 210/186
(58) Field of Search ................................ 210/186, 222, 210/223

(56) References Cited

U.S. PATENT DOCUMENTS 5,510,024 A * 4/1996 Caiozza ...................... 210/223
5,879,549 A * 3/1999 Caiozza ...................... 210/223

* cited by examiner

Primary Examiner—David A. Reifsnyder

(57) ABSTRACT

A filter cartridge magnetic attachment includes a heat sink carrier member which includes magnet-reception channels, and carrier-embedded magnets are received in the magnet-reception channels. A top modular magnet/shunt array is located on a top side of the carrier member, and a bottom modular magnet/shunt array is located on a bottom side of the carrier member. The filter cartridge magnetic attachment is mounted on a oil filter cartridge and separates metallic particles out from the oil that circulates through the oil filter cartridge. The carrier-embedded magnets include a first directional orientation carrier-embedded magnet which includes a positive pole end and a negative pole end. The carrier-embedded magnets also include a second directional orientation carrier-embedded magnet which includes a positive pole end and a negative pole end. The first directional orientation carrier-embedded magnet and the second directional orientation carrier-embedded magnet are oriented in parallel, and the positive pole end of the first directional orientation carrier-embedded magnet is co-directional with the negative pole end of the second directional orientation carrier-embedded magnet. Each modular magnet/shunt array includes cylindrical magnets, and shunt blocks are positioned at longitudinal polar ends of the cylindrical magnets. The cylindrical magnets in the respective modular magnet/shunt arrays are aligned in parallel with the respective positive pole ends and the respective negative pole ends placed side by side. The shunt blocks include wire-reception channels. Assembly binding wire is received in the wire-reception channels.

14 Claims, 4 Drawing Sheets

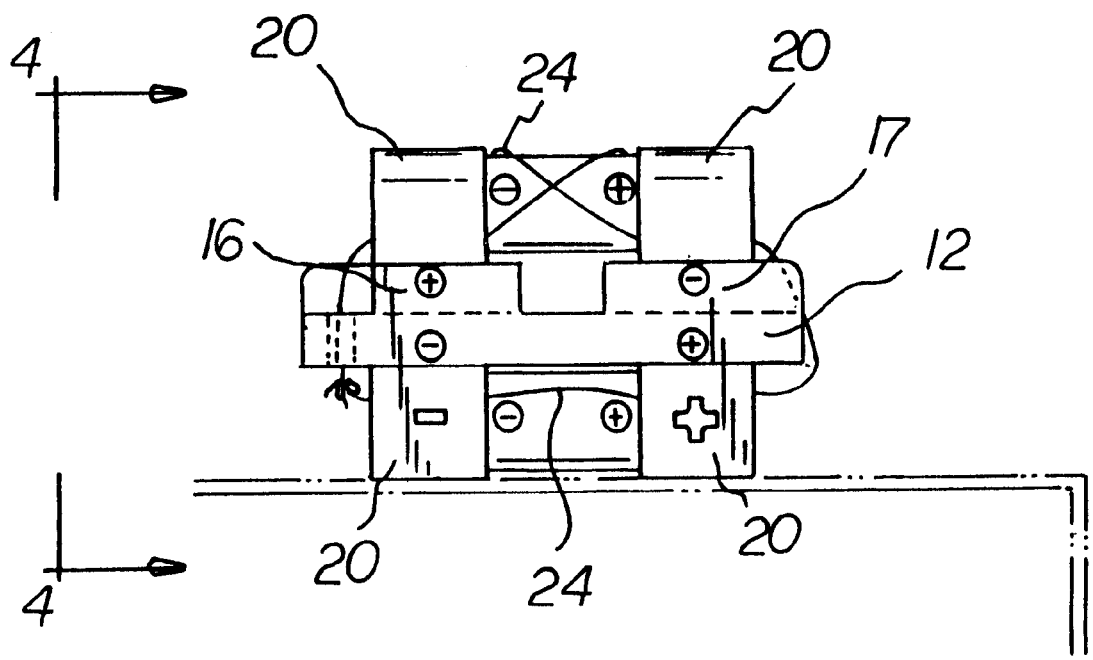
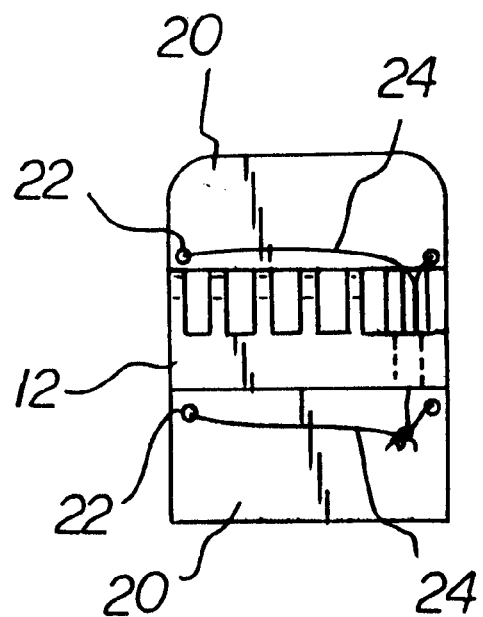

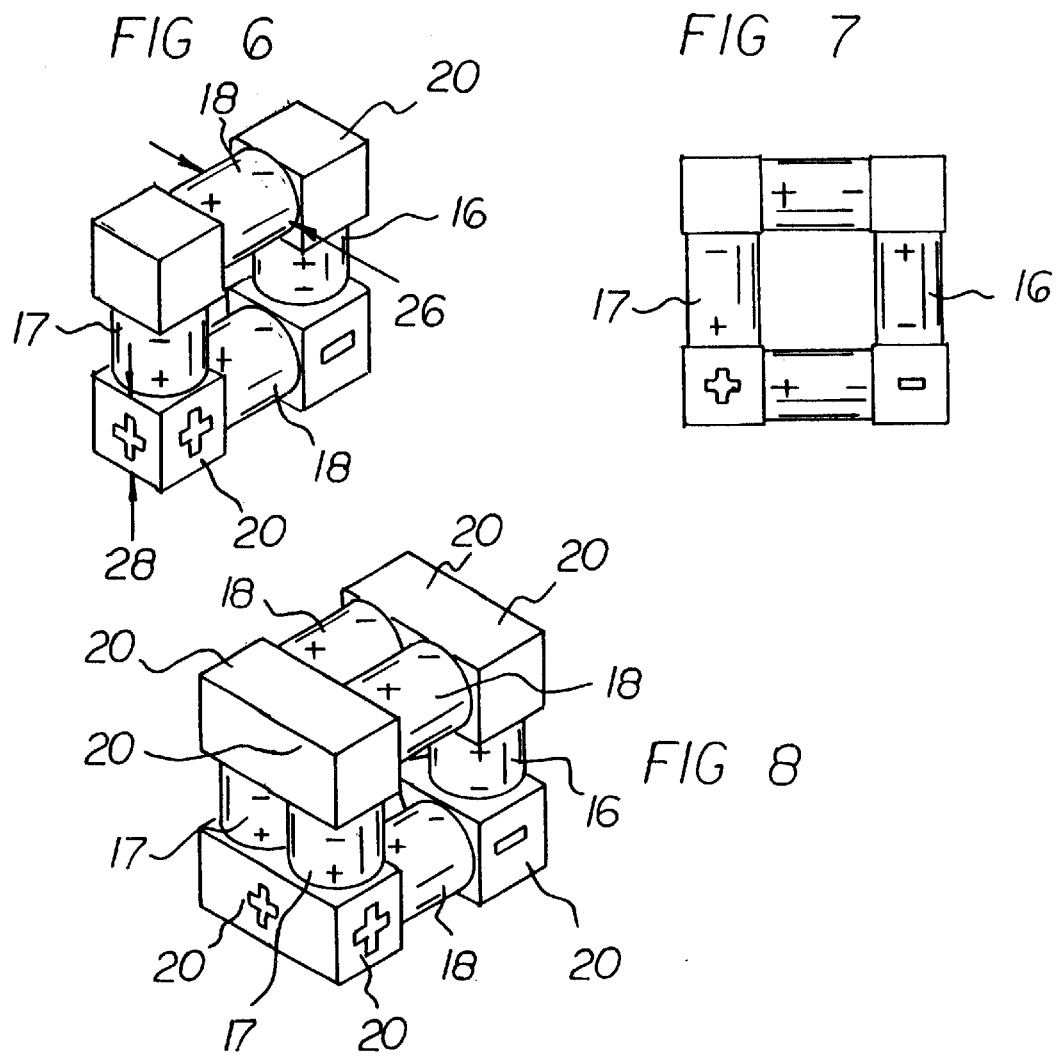
FIG 6
FIG 7
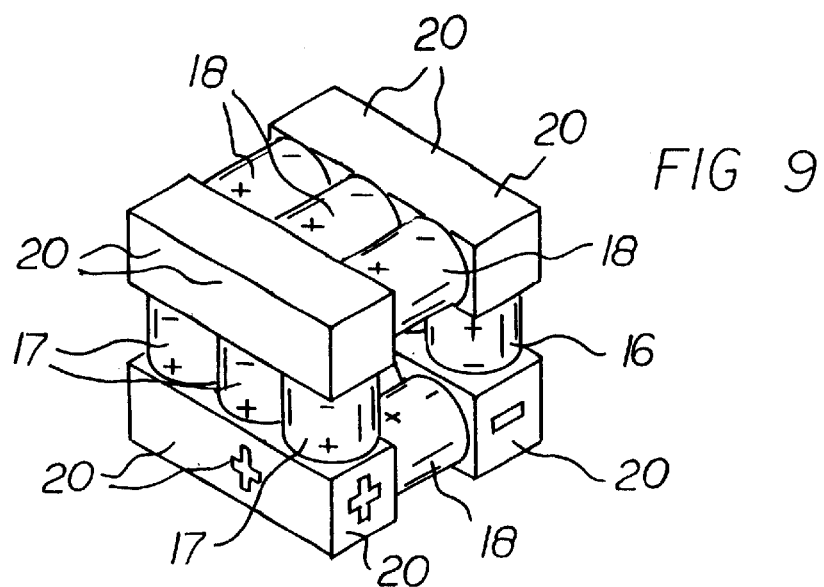
FIG 8
FIG 9

FILTER CARTRIDGE MAGNETIC ATTACHMENT

BACKGROUND OF THE INVENTION

1. Field of the Invention

The present invention relates generally to an improved magnet assembly, and more particularly, to a magnet assembly especially useful as a filtering device or as a filter cartridge magnetic attachment for magnetically collecting metallic particles within a filter.

2. Description of the Prior Art

The devices disclosed herein are improvement devices relating to the subject matter set forth in U.S. Pat. No. 5,510,024, incorporated herein by reference, by the same inventor. In U.S. Pat. No. 5,510,024, a number of cylindrical magnets are embedded in a heat sink, and the combination of the cylindrical magnets and the heat sink is strapped onto the outside of an oil filter cartridge. The magnetic lines of force of the cylindrical magnets exert their influence through the wall of the oil filter cartridge and attract metallic particles present in the oil inside the oil filter cartridge. As a result, those attracted particles stick to the inside wall of the oil filter cartridge and are prevented from circulating in the oil.

The purpose of the present invention is to provide magnet assemblies that increase the magnetic lines of force so that the magnet assemblies exert greater attractive force on the metallic particles present in the oil inside the oil filter cartridge. As a result, with the magnet assemblies of the present invention, the metallic particles present in the oil both stick to the inside wall of the oil filter cartridge and are prevented from circulating in the oil with greater force and effect.

In addition, with the present invention, the improved magnet assemblies are made from modular components. As a result, the improved magnet assemblies can be made in a wide range of sizes and strengths simply by combining the modular components as desired.

In conjunction with the modular components of the present invention, the modular components are provided with means to bind the modular components together to form a secure magnet assembly unit.

As mentioned above, the filter cartridge magnetic attachment disclosed in U.S. Pat. No. 5,510,024 provides cylindrical magnets embedded in a heat sink. In this respect, the heat sink with the embedded cylindrical magnets forms a heat-sink-magnet module. It would be desirable to both keep and improve upon the beneficial characteristics of the heat-sink-magnet module set forth in U.S. Pat. No. 5,510,024. To do so, it would be desirable to employ the heat-sink-magnet module in conjunction with the modular components of the present invention.

Thus, while the foregoing prior art indicates it to be known to use a filter cartridge magnetic attachment, the prior art described above does not teach or suggest a filter cartridge magnetic attachment which has the following combination of desirable features: (1) provides magnet assemblies that increase the magnetic lines of force so that the magnet assemblies exert greater attractive force on the metallic particles present in the oil inside the oil filter cartridge; (2) can be made in a wide range of sizes and strengths simply by combining modular components as desired; (3) is provided with means to bind the modular components together to form a secure magnet assembly unit; and (4) employs a heat-sink-magnet module in conjunction with the modular magnetic components. The foregoing desired characteristics are provided by the unique filter cartridge magnetic attachment of the present invention as will be made apparent from the following description thereof. Other advantages of the present invention over the prior art also will be rendered evident.

SUMMARY OF THE INVENTION

To achieve the foregoing and other advantages, the present invention, briefly described, provides a filter cartridge magnetic attachment that includes a carrier member which includes magnet-reception channels, and carrier-embedded magnets received in the magnet-reception channels. A top modular magnet/shunt array is located on a top side of the carrier member, and a bottom modular magnet/shunt array is located on a bottom side of the carrier member. The filter cartridge magnetic attachment is mounted on a oil filter cartridge and separates metallic particles out from the oil that circulates through the oil filter cartridge.

The carrier-embedded magnets include a first directional orientation carrier-embedded magnet which includes a positive pole end and a negative pole end. The carrier-embedded magnets also include a second directional orientation carrier-embedded magnet which includes a positive pole end and a negative pole end. The first directional orientation carrier-embedded magnet and the second directional orientation carrier-embedded magnet are oriented in parallel, and the positive pole end of the first directional orientation carrier-embedded magnet is co-directional with the negative pole end of the second directional orientation carrier-embedded magnet.

Each of the top modular magnet/shunt array and the bottom modular magnet/shunt array includes cylindrical magnets, and shunt blocks are positioned at longitudinal polar ends of the cylindrical magnets. The shunt blocks of the top modular magnet/shunt array can include rounded shunt ends.

Each of the cylindrical magnets in each of the top modular magnet/shunt array and the bottom modular magnet/shunt array includes a positive pole end and a negative pole end. The cylindrical magnets are aligned in parallel with the respective positive pole ends and the respective negative pole ends placed side by side.

The shunt blocks includes wire-reception channels. Assembly binding wire is received in the wire-reception channels. The carrier member can be comprised of a heat sink. The cylindrical magnets have an end diameter, and the shunt blocks have a shunt height which is approximately equal to the end diameter. The shunt blocks can are cubical shunt blocks.

In accordance with another aspect of the invention, a magnet array apparatus is provided which includes at least one top modular magnet/shunt array, at least one bottom modular magnet/shunt array, and at least one first directional orientation carrier-embedded magnet and at least one second directional orientation carrier-embedded magnet magnetically connected between the top modular magnet/shunt array and the bottom modular magnet/shunt array.

In another magnet array, the top modular magnet/shunt array includes two cylindrical magnets and two shunt blocks, the bottom modular magnet/shunt array includes two cylindrical magnets and two shunt blocks. A pair of first directional orientation carrier-embedded magnets are positioned between one shunt block of the top modular magnet/shunt array and one shunt block of the bottom modular magnet/shunt array, and a pair of second directional orientation carrier-embedded magnets are positioned between other of said two shunt blocks of the top modular magnet/shunt array and other of said two shunt blocks of the bottom modular magnet/shunt array.

In another magnet array, the top modular magnet/shunt array includes three cylindrical magnets and two shunt blocks, the bottom modular magnet/shunt array includes three cylindrical magnets and two shunt blocks. A set of three first directional orientation carrier-embedded magnets are positioned between one shunt block of the top modular magnet/shunt array and one shunt block of the bottom modular magnet/shunt array, and a set of three second directional orientation carrier-embedded magnets are positioned between the other of said two shunt blocks of the top modular magnet/shunt array and other of said two shunt blocks of the bottom modular magnet/shunt array.

For a general magnet array, in accordance with the invention, the top modular magnet/shunt array includes N cylindrical magnets and two shunt blocks. The bottom modular magnet/shunt array includes N cylindrical magnets and two shunt blocks. A set of N first directional orientation carrier-embedded magnets are positioned between one shunt block of the top modular magnet/shunt array and one shunt block of the bottom modular magnet/shunt array. Also, a set of N second directional orientation carrier-embedded magnets are positioned between other shunt block of the top modular magnet/shunt array and other shunt block of the bottom modular magnet/shunt array.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved filter cartridge magnetic attachment which has all of the advantages of the prior art and none of the disadvantages.

It is another object of the present invention to provide a new and improved filter cartridge magnetic attachment which may be easily and efficiently manufactured and marketed.

It is a further object of the present invention to provide a new and improved filter cartridge magnetic attachment which is of durable and reliable construction.

An even further object of the present invention is to provide a new and improved filter cartridge magnetic attachment which is susceptible of a low cost of manufacture with regard to both materials and labor, and which accordingly is then susceptible of low prices of sale to the consuming public, thereby making such filter cartridge magnetic attachment available to the buying public.

Still yet a further object of the present invention is to provide a new and improved filter cartridge magnetic attachment which provides magnet assemblies that increase the magnetic lines of force so that the magnet assemblies exert greater attractive force on the metallic particles present in the oil inside the oil filter cartridge.

Still another object of the present invention is to provide a new and improved filter cartridge magnetic attachment that can be made in a wide range of sizes and strengths simply by combining modular components as desired.

Yet another object of the present invention is to provide a new and improved filter cartridge magnetic attachment which has means to bind the modular components together to form a secure magnet assembly unit.

Even another object of the present invention is to provide a new and improved filter cartridge magnetic attachment that employs a heat-sink-magnet module in conjunction with the modular magnetic components.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a side view of the embodiment of the filter cartridge magnetic attachment of FIG. 2, shown in relation to the oil filter cartridge.

FIG. 4 is a front view of the embodiment of the invention shown in FIG. 3 taken along line 4—4 thereof.

FIG. 6 is a perspective view of an another embodiment of a magnet assembly of the invention that is comprised of modular units and that is made from four cylindrical magnets and four cubical shunts.

FIG. 7 is a front view of the embodiment shown in FIG. 6.

FIG. 8 is a perspective view of an another embodiment of a magnet assembly of the invention that is comprised of modular units and that is made from eight cylindrical magnets and four rectangular shunts.

FIG. 9 is a perspective view of an another embodiment of a magnet assembly of the invention that is comprised of modular units and that is made from twelve cylindrical magnets and four rectangular shunts.

DESCRIPTION OF THE PREFERRED EMBODIMENT

Figure 1:
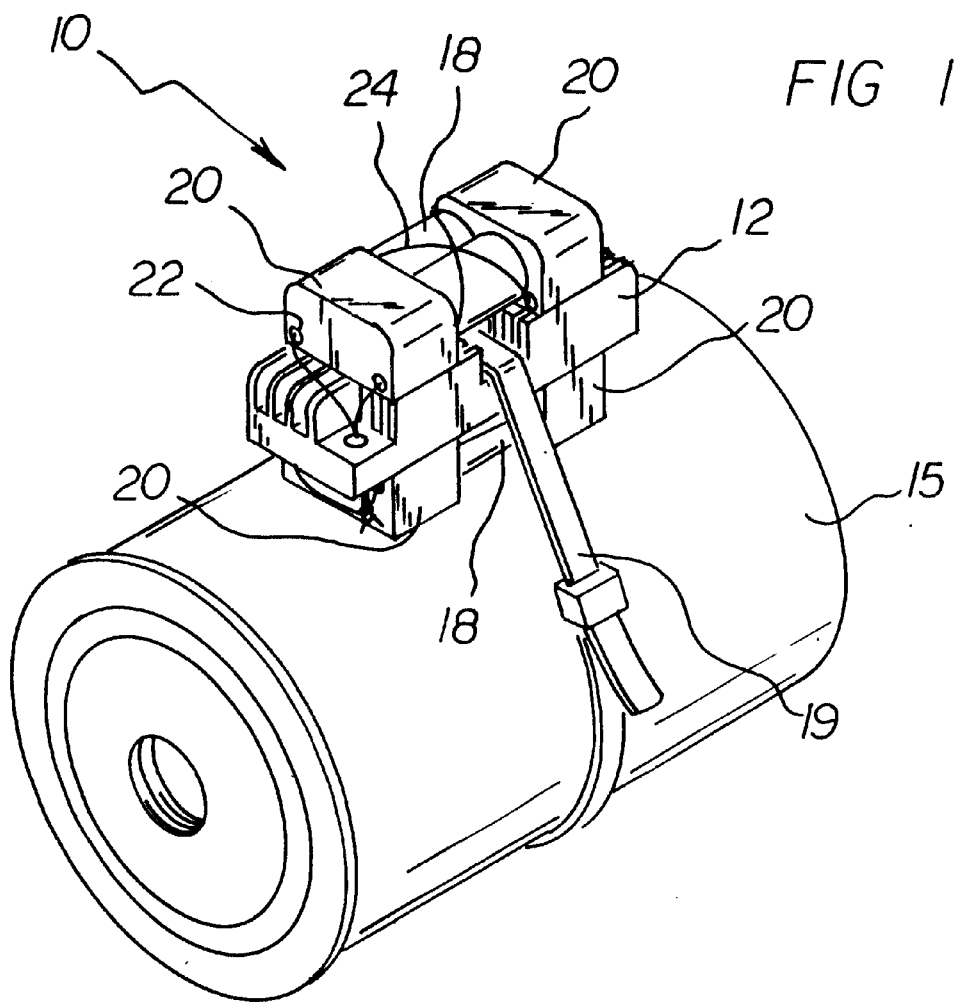
FIG. 1 is a perspective view showing a first embodiment of the filter cartridge magnetic attachment of the invention that is attached to an oil filter cartridge.
Figure 2:
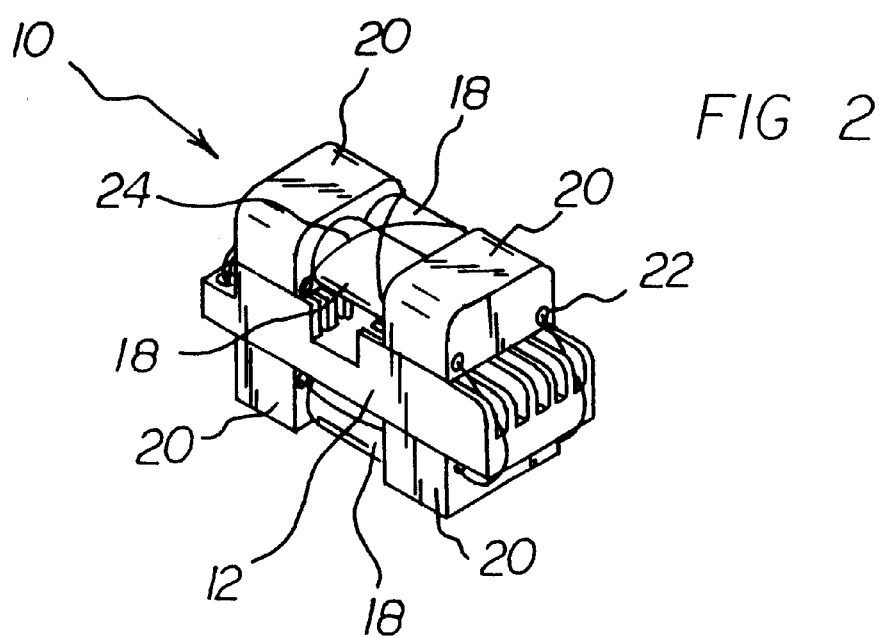
FIG. 2 is a perspective view of the embodiment of the filter cartridge magnetic attachment shown in FIG. 1 removed from the oil filter cartridge.
Figure 5:
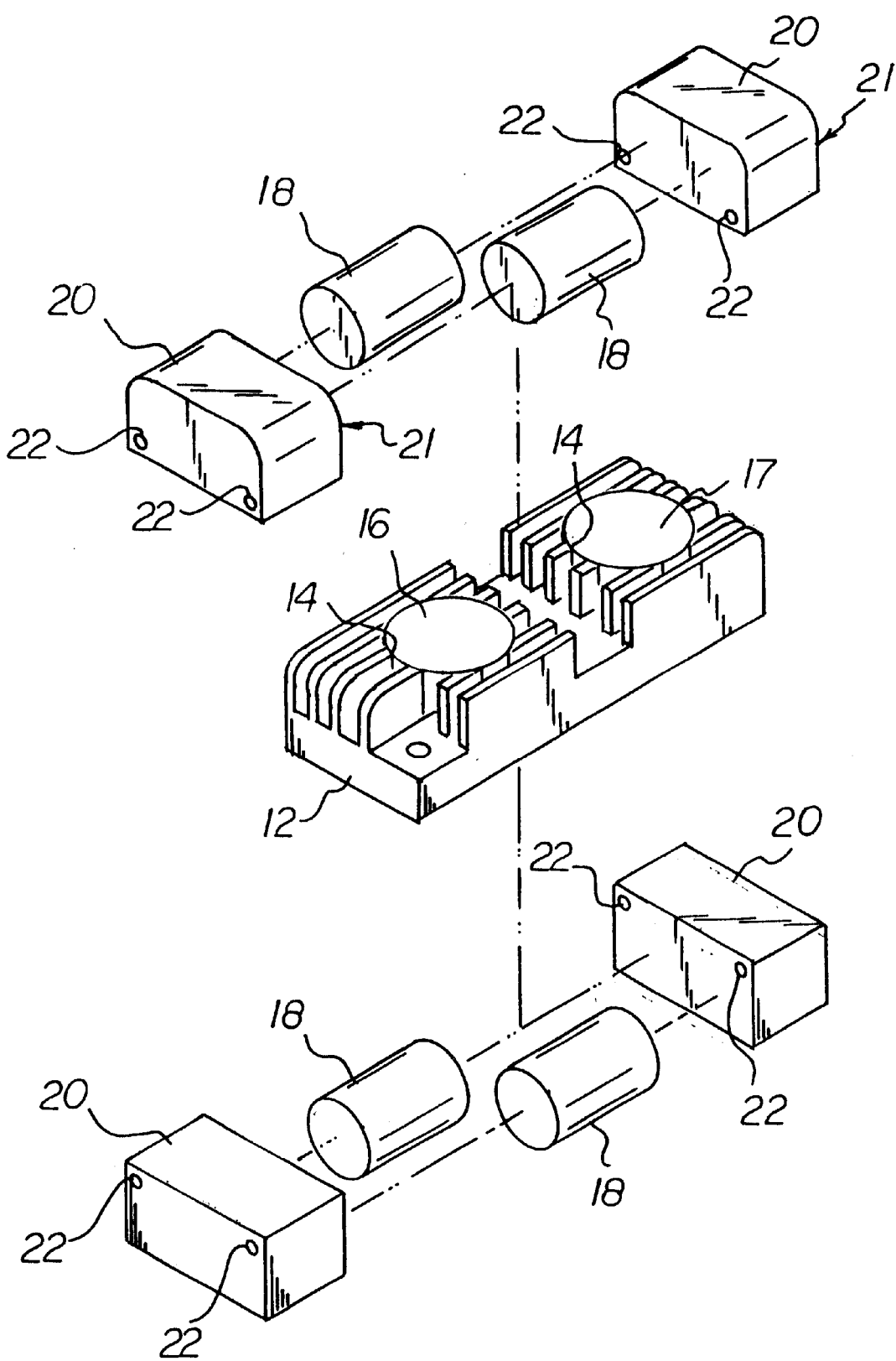
FIG. 5 is an exploded perspective view of the embodiment of the invention shown in FIGS. 1–4.

With reference to the drawings, a new and improved filter cartridge magnetic attachment embodying the principles and concepts of the present invention will be described.

Turning to FIGS. 1–4, there is shown a first embodiment of the filter cartridge magnetic attachment of the invention generally designated by reference numeral 10. In the first embodiment, the filter cartridge magnetic attachment 10 includes a carrier member 12 which includes magnet-reception channels 14, carrier-embedded magnets received in the magnet-reception channels 14. A top modular magnet/shunt array is located on a top side of the carrier member 12, and a bottom modular magnet/shunt array is located on a bottom side of the carrier member 12.

The carrier-embedded magnets include a first directional orientation carrier-embedded magnet 16 which includes a positive pole end and a negative pole end. The carrier-embedded magnets also include a second directional orientation carrier-embedded magnet 17 which includes a positive pole end and a negative pole end. The first directional orientation carrier-embedded magnet 16 and the second directional orientation carrier-embedded magnet 17 are oriented in parallel, and the positive pole end of the first directional orientation carrier-embedded magnet 16 is co-directional with the negative pole end of the second directional orientation carrier-embedded magnet 17.

Each of the top modular magnet/shunt array and the bottom modular magnet/shunt array includes cylindrical magnets 18, and shunt blocks 20 are positioned at longitudinal polar ends of the cylindrical magnets 18. The shunt blocks 20 of the top modular magnet/shunt array can include rounded shunt ends 21. The rounded shunt ends 21 enhance concentration the magnetic lines of force.

Each of the cylindrical magnets 18 in each of the top modular magnet/shunt array and the bottom modular magnet/shunt array includes a positive pole end and a negative pole end. The cylindrical magnets 18 are aligned in parallel with the respective positive pole ends and the respective negative pole ends placed side by side.

The shunt blocks 20 includes wire-reception channels 22. Assembly binding wire 24 is received in the wire-reception channels 22. The carrier member 12 can be comprised of a heat sink. The carrier member 12 with its carrier-embedded magnets can be equivalent to the heat-sink-magnet module disclosed in U. S. Pat. No. 5,510,024, incorporated herein by reference. The cylindrical magnets 18 have an end diameter 26, and the shunt blocks 20 have a shunt height 28 which is approximately equal to the end diameter 26. The shunt blocks 20 can are cubical shunt blocks.

The use of the filter cartridge magnetic attachment 10 is shown in FIG. 1, wherein the filter cartridge magnetic attachment 10 is attached to an oil filter cartridge 15 using a strap 19 that is placed over the carrier member 12 and wrapped around the oil filter cartridge 15. As shown in FIG. 1, the bottom modular magnet/shunt array is positioned below the carrier member 12 and is in contact with the oil filter cartridge 15, and the top modular magnet/shunt array is positioned above the carrier member 12. With the embodiment of the invention shown in FIGS. 1–4, an assembly binding wire 24 is threaded through the wire-reception channels 22 in the shunt blocks 20, and the assembly binding wire 24 is tied tightly to assure that the top modular magnet/shunt array, the carrier member 12 with its carrier-embedded magnets, and the bottom modular magnet/shunt array remain bound tightly together.

Turning to the embodiments of the invention shown in FIGS. 6–9, for purposes of simplicity, the carrier member 12 it not shown, but is understood to be present. In this respect, for the embodiment of the invention shown in FIGS. 6 and 7, the carrier member 12 (not shown) includes one first directional orientation carrier-embedded magnet 16 and one second directional orientation carrier-embedded magnet 17.

For the embodiment of the invention shown in FIG. 8, the carrier member 12 (not shown) includes a set of two first directional orientation carrier-embedded magnets 16 with their respective positive pole ends and negative pole ends oriented co-directionally and a set of two second directional orientation carrier-embedded magnets 17 with their respective positive pole ends and negative pole ends oriented co-directionally. The set of first directional orientation carrier-embedded magnets 16 and the set of second directional orientation carrier-embedded magnets 17 are oriented anti-directional with respect to each other.

For the embodiment of the invention shown in FIG. 9, the carrier member 12 (not shown) includes a set of three first directional orientation carrier-embedded magnets 16 with their respective positive pole ends and negative pole ends oriented co-directionally and a set of three second directional orientation carrier-embedded magnets 17 with their respective positive pole ends and negative pole ends oriented co-directionally. The set of first directional orientation carrier-embedded magnets 16 and the set of second directional orientation carrier-embedded magnets 17 are oriented anti-directional with respect to each other.

In general, for other embodiments of the invention not illustrated, the carrier member 12 (not shown) can include a set of N first directional orientation carrier-embedded magnets 16 with their respective positive pole ends and negative pole ends oriented co-directionally and a set of N second directional orientation carrier-embedded magnets 17 with their respective positive pole ends and negative pole ends oriented co-directionally. The set of first directional orientation carrier-embedded magnets 16 and the set of second directional orientation carrier-embedded magnets 17 are oriented anti-directional with respect to each other. In addition, the top modular magnet/shunt array can include N cylindrical magnets 18 and two shunt blocks 20. The bottom modular magnet/shunt array can include N cylindrical magnets 18 and two shunt blocks 20. The set of N first directional orientation carrier-embedded magnets 16 are positioned between one shunt block of the top modular magnet/shunt array and one shunt block 20 of the bottom modular magnet/shunt array. Also, the set of N second directional orientation carrier-embedded magnets 17 are positioned between the other shunt block 20 of the top modular magnet/shunt array and the other shunt block 20 of the bottom modular magnet/shunt array.

In accordance with another aspect of the invention, a magnet array apparatus is provided which includes at least one top modular magnet/shunt array, at least one bottom modular magnet/shunt array, and at least one first directional orientation carrier-embedded magnet 16 and at least one second directional orientation carrier-embedded magnet 17 magnetically connected between the top modular magnet/shunt array and the bottom modular magnet/shunt array.

In another magnet array, the top modular magnet/shunt array includes two cylindrical magnets 18 and two shunt blocks 20, the bottom modular magnet/shunt array includes two cylindrical magnets 18 and two shunt blocks 20. A pair of first directional orientation carrier-embedded magnets 16 are positioned between one shunt block of the top modular magnet/shunt array and one shunt block 20 of the bottom modular magnet/shunt array, and a pair of second directional orientation carrier-embedded magnets 17 are positioned between other shunt block 20 of the top modular magnet/shunt array and other shunt block 20 of the bottom modular magnet/shunt array.

In another magnet array, the top modular magnet/shunt array includes three cylindrical magnets 18 and two shunt blocks 20, the bottom modular magnet/shunt array includes three cylindrical magnets 18 and two shunt blocks 20. A set of three first directional orientation carrier-embedded magnets 16 are positioned between one of the top modular magnet/shunt array and one of the shunt blocks 20 of the bottom modular magnet/shunt array, and a set of three second directional orientation carrier-embedded magnets 17 are positioned between the other shunt block 20 of the top modular magnet/shunt array and other shunt block 20 of the bottom modular magnet/shunt array.

For a general magnet array, in accordance with the invention, the top modular magnet/shunt array includes N cylindrical magnets 18 and two shunt blocks 20. The bottom modular magnet/shunt array includes N cylindrical magnets 18 and two shunt blocks 20. A set of N first directional orientation carrier.embedded magnets 16 are positioned between one shunt block of the top modular magnet/shunt array and one shunt block 20 of the bottom modular magnet/shunt array. Also, a set of N second directional orientation carrier-embedded magnets 17 are positioned between other shunt block 20 of the top modular magnet/shunt array and other shunt block 20 of the bottom modular magnet/shunt array. Each shunt block 20 has a longitudinal extent sufficient to span N cylindrical magnets 18.

The components of the filter cartridge magnetic attachment of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved filter cartridge magnetic attachment that is low in cost, relatively simple in design and operation, and which may advantageously be used to provide magnet assemblies that increase the magnetic lines of force so that the magnet assemblies exert greater attractive force on the metallic particles present in the oil inside the oil filter cartridge. With the invention, a filter cartridge magnetic attachment is provided which can be made in a wide range of sizes and strengths simply by combining modular components as desired. With the invention, a filter cartridge magnetic attachment is provided which is provided with means to bind the modular components together to form a secure magnet assembly unit. With the invention, a filter cartridge magnetic attachment is provided which employs a heat-sink-magnet module in conjunction with the modular magnetic components.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A filter cartridge magnetic attachment, comprising:
   a carrier member which includes magnet-reception channels,
   carrier-embedded magnets received in said magnet-reception channels,
   a top modular magnet/shunt array located on a top side of said carrier member, and
   a bottom modular magnet/shunt array located on a bottom side of said carrier member.

2. The attachment of claim 1 wherein said carrier-embedded magnets include:
   a first directional orientation carrier-embedded magnet which includes a positive pole end and a negative pole end, and
   a second directional orientation carrier-embedded magnet which includes a positive pole end and a negative pole end,
   wherein said first directional orientation carrier-embedded magnet and said second directional orientation carrier-embedded magnet are oriented in parallel, and wherein said positive pole end of said first directional orientation carrier-embedded magnet is co-directional with said negative pole end of said second directional orientation carrier-embedded magnet.

3. The attachment of claim 1 wherein each of said top modular magnet/shunt array and said bottom modular magnet/shunt array includes:
   cylindrical magnets, and
   shunt blocks positioned at longitudinal polar ends of said cylindrical magnets.

4. The attachment of claim 3 wherein said shunt blocks of said top modular magnet/shunt array include rounded shunt ends.

5. The attachment of claim 3 wherein:
   each of said cylindrical magnets includes a positive pole end and a negative pole end,
   in each of said top modular magnet/shunt array and said bottom modular magnet/shunt array, said cylindrical magnets are aligned in parallel with said respective positive pole ends and said respective negative pole ends placed side by side.

6. The attachment of claim 3 wherein said shunt blocks include wire-reception channels.

7. The attachment of claim 6, further including:

assembly binding wire received in said wire-reception channels.

8. The attachment of claim 3 wherein:

said cylindrical magnets have an end diameter, said shunt blocks have a shunt height which is approximately equal to said end diameter.

9. The attachment of claim 8 wherein said shunt blocks are cubical shunt blocks.

10. The attachment of claim 1 wherein said carrier member is comprised of a heat sink.

11. A magnet array apparatus, comprising:

at least one top modular magnet/shunt array, at least one bottom modular magnet/shunt array, and at least one first directional orientation carrier-embedded magnet and at least one second directional orientation carrier-embedded magnet magnetically connected between said top modular magnet/shunt array and said bottom modular magnet/shunt array.

12. The apparatus of claim 11 wherein:

said top modular magnet/shunt array includes two cylindrical magnets and two shunt blocks, said bottom modular magnet/shunt array includes two cylindrical magnets and two shunt blocks, a pair of first directional orientation carrier-embedded magnets are positioned between one shunt block of said top modular magnet/shunt array and one shunt block of said bottom modular magnet/shunt array, and a pair of second directional orientation carrier-embedded magnets are positioned between other of said two shunt blocks of said top modular magnet/shunt array and other of said two shunt blocks of said bottom modular magnet/shunt array.

13. The apparatus of claim 11 wherein:

said top modular magnet/shunt array includes three cylindrical magnets and two shunt blocks, said bottom modular magnet/shunt array includes three cylindrical magnets and two shunt blocks, a set of three first directional orientation carrier-embedded magnets are positioned between one shunt block of said top modular magnet/shunt array and one shunt block of said bottom modular magnet/shunt array, and a set of three second directional orientation carrier-embedded magnets are positioned between the other of said shunt blocks of said top modular magnet/shunt array and the other of said shunt blocks of said bottom modular magnet/shunt array.

14. The apparatus of claim 11 wherein:

said top modular magnet/shunt array includes N cylindrical magnets and two shunt blocks, said bottom modular magnet/shunt array includes N cylindrical magnets and two shunt blocks, a set of N first directional orientation carrier-embedded magnets are positioned between one shunt block of said top modular magnet/shunt array and one shunt block of said bottom modular magnet/shunt array, and a set of N second directional orientation carrier-embedded magnets are positioned between other shunt block of said top modular magnet/shunt array and other shunt block of said bottom modular magnet/shunt array.

\* \* \* \* \*